(12) United States Patent
Schuett et al.

(10) Patent No.: US 8,451,837 B1
(45) Date of Patent: May 28, 2013

(54) DISCOVERY OF MPLS VPN LINKS

(75) Inventors: Michael L. Schuett, Fremont, CA (US);
Halsur V. Sreekantaswamy, San Jose, CA (US); Atulya Chandra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 365 days.

(21) Appl. No.: 12/816,739

(22) Filed: Jun. 16, 2010

(51) Int. Cl.
*H04L 12/56* (2006.01)

(52) U.S. Cl.
USPC .............. 370/390; 370/395.5; 370/395.53; 370/401; 370/392

(58) Field of Classification Search
USPC ............. 370/242, 392, 401, 469, 390, 395.5, 370/395.53
See application file for complete search history.

(56) References Cited

U.S. PATENT DOCUMENTS

| | | | |
|---|---|---|---|
| 6,512,768 B1 | 1/2003 | Thomas | |
| 6,614,808 B1 * | 9/2003 | Gopalakrishna | 370/469 |
| 7,593,352 B2 | 9/2009 | Verma | |
| 7,675,912 B1 * | 3/2010 | Ward et al. | 370/392 |
| 7,720,009 B2 | 5/2010 | Mellachervu et al. | |
| 8,117,338 B2 * | 2/2012 | Ould-Brahim | 709/242 |
| 8,208,377 B2 * | 6/2012 | Subramanian et al. | 370/230 |
| 2004/0223491 A1 * | 11/2004 | Levy-Abegnoli et al. | 370/389 |
| 2006/0087977 A1 * | 4/2006 | Tatman | 370/242 |
| 2010/0074268 A1 * | 3/2010 | Raza | 370/401 |

* cited by examiner

*Primary Examiner* — Andrew Chriss
*Assistant Examiner* — Mohamed Kamara
(74) *Attorney, Agent, or Firm* — Edell, Shapiro & Finnan, LLC (57) ABSTRACT

A method for discovering MPLS VPN links includes receiving a plurality of virtual route forwarding (VRF) identification messages generated by respective VRF entities at a logical parent Multi-Protocol Border Gateway Protocol instance resident within a virtual network element in a network management system, aggregating in the logical parent Multi-Protocol Border Gateway Protocol instance the plurality of VRF identification messages into a single Multi-Protocol Border Gateway Protocol message encapsulating the plurality of VRF identification messages, and sending the single Multi-Protocol Border Gateway Protocol message encapsulating the plurality of VRF identification messages to a neighbor parent Multi-Protocol Border Gateway Protocol instance.

20 Claims, 6 Drawing Sheets

```
VrfLinkDiscoveryMsg
+-------------------------------------------------------------+
| Src Vrf| IPv4        | IPv4                | IPv6            | IPv6            |
| InstID | ImportRTs   | ExportRTs           | ImportRTs       | ExportRTs       |
+-------------------------------------------------------------+
```

*Fig. 3A* — 310

```
VrfAggregatedDiscoveryMsg
+-------------------------------------------------------------+
| VrfLinkDiscoveryMsg #1 | ... | VrfLinkDiscoveryMsg #N |
+-------------------------------------------------------------+
```

*Fig. 3B* — 320

```
VrfConnectMsg
+-------------------------------------------------------------+
| Src Vrf | Dest Vrf| IPv4              | IPv6              |
| InstID  | InstID  | LinkDir           | LinkDir           |
|         |         | (Ingr,Egr,Bidir)  | (Ingr,Egr,Bidir)  |
+-------------------------------------------------------------+
```

DISCOVERY OF MPLS VPN LINKS

TECHNICAL FIELD

The present disclosure relates to management of communication networks, particularly multiprotocol label switching (MPLS) virtual private networks (VPNs).

BACKGROUND

One purpose of a VPN is to interconnect multiple remote offices, nodes or sites with one another and/or a central office or node and thereby offer unified services such as, among many other possible applications, database access, email, calendaring, inventory control, etc. Thus, for example, a national retail chain might want to implement a VPN to interconnect individual stores with a central office and with one another. In such a scenario, the underlying network may comprise a vast number of individual computers and local area networks (LANs) or combinations thereof. A given VPN that leverages these networked computers and LANs may thus have multiple branches, leveraging multiple physical routing devices and interconnections to handle the geographically distributed nature of the physical stores and central office.

To better serve the growing VPN marketplace, service providers are increasingly relying on MPLS VPNs for geographically separated customer sites. An MPLS VPN comprises a customer network and a service provider network. MPLS VPN service provider edge (PE) routers store customer routing information enabling the PE routers to route traffic belonging to respective customers for inter-site traffic. That traffic is delivered to the customer sites via respective customer edge (CE) routers.

In an MPLS VPN implementation, a PE router performs multiple functions. For example, the PE router isolates customer traffic if more than one customer is connected to the PE router. Each customer is, accordingly, assigned an independent routing table. The PE router shares theses routing tables with other deployed PE routers so that customer traffic can seamlessly flow between customer sites via the service provider's own network or backbone. The protocol for sharing this routing information between PE routers is the multiprotocol border gateway protocol (MP-BGP). Considering the complexity of such MPLS VPN implementations, a continuing challenge for service providers is to efficiently manage their networks on behalf of their customers.

DESCRIPTION OF EXAMPLE EMBODIMENTS

Overview

In one embodiment, there is provided within a Network Management System comprising virtual network elements a method for discovering MPLS VPN links by receiving a plurality of virtual route forwarding identification messages generated by respective VRF entities at a logical parent Multi-Protocol Border Gateway Protocol instance, aggregating in the logical parent Multi-Protocol Border Gateway Protocol instance the plurality of virtual route forwarding identification messages into a single Multi-Protocol Border Gateway Protocol message encapsulating the plurality of virtual route forwarding identification messages, and sending the single Multi-Protocol Border Gateway Protocol message encapsulating the plurality of virtual route forwarding identification messages to a neighbor parent Multi-Protocol Border Gateway Protocol instance.

At the neighbor parent Multi-Protocol Border Gateway Protocol instance, the single Multi-Protocol Border Gateway Protocol message encapsulating the plurality of virtual route forwarding identification messages is disaggregated and the resulting individual virtual route forwarding identification messages are passed to local (child) virtual route forwarding entities to determine whether matching Route Targets exist. When a match between a given child virtual route forwarding entity and a source virtual route forwarding entity is detected, the given child virtual route forwarding entity sends a "connect" message to the source virtual route forwarding entity, thus establishing a link between the two virtual route forwarding entities. The discovery of connected virtual route forwarding entities is reported to a central location for further processing.

A network management system (NMS), in the form of a VPN service provider management tool that operates in conjunction with an MPLS VPN link discovery module, initiates the exchange of messages and then provides, in one possible implementation, a visual or graphical display of MPLS VPN links within a network.

Example Embodiments

Figure 1:
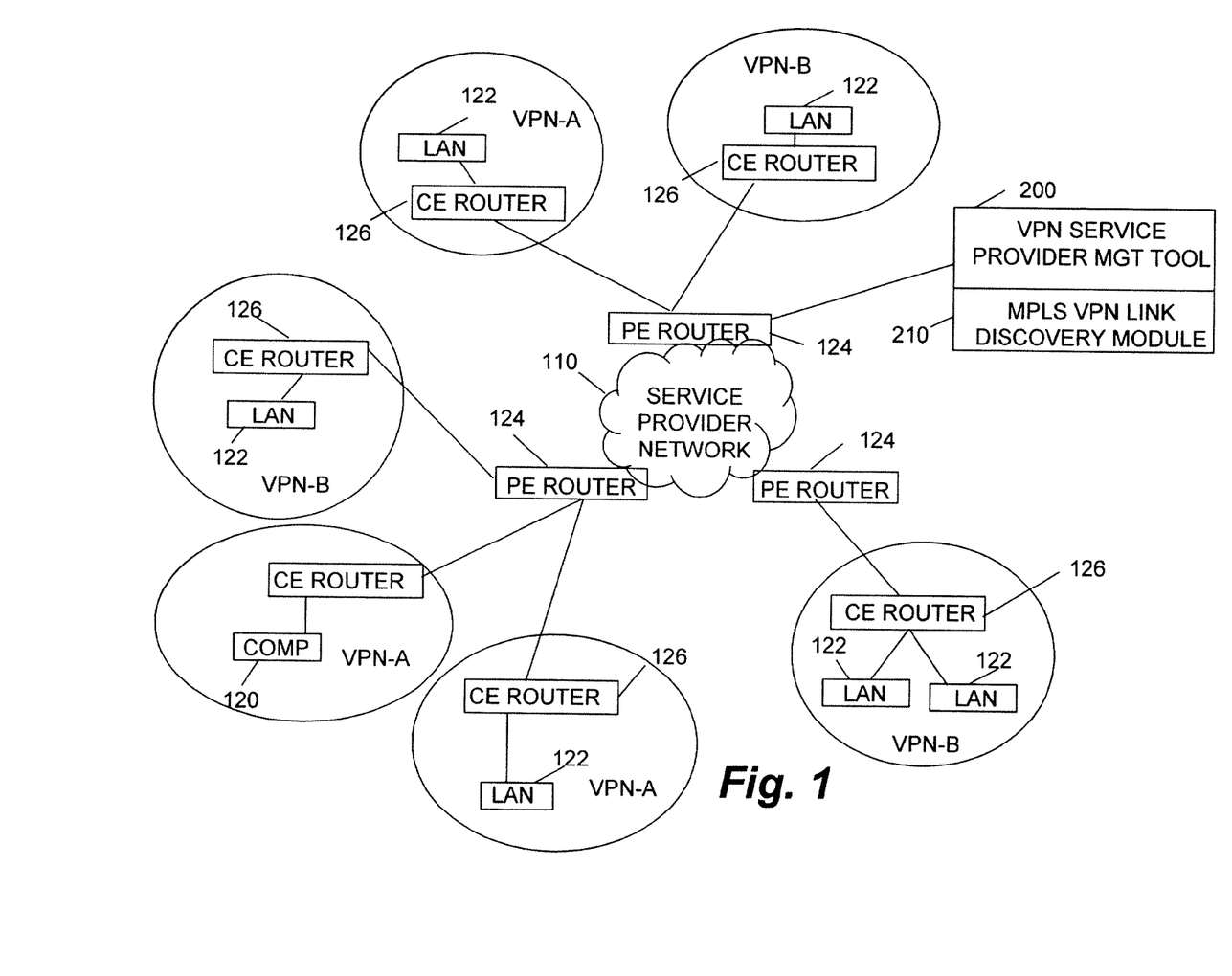
FIG. 1 shows a communication network that supports multiple VPNs and a multiprotocol label switching (MPLS) VPN link discovery module for identifying VPN links.

FIG. 1 shows a service provider communication network 110 that supports multiple VPNs. More specifically, the communication network 110 comprises a plurality of provider edge (PE) routers 124 interconnected with one another via the service provider network 110. Network 110 could comprise a copper or fiber optic network (or a combination thereof) supporting electronic protocol-based data communication between the routers 124 and ultimately between and among computers 120 and/or local area networks (LANs) 122 via customer edge (CE) routers 126. Of course, those skilled in the art will appreciate that FIG. 1 depicts a simplified view of network topologies that may actually be fielded. A typical network might include thousands of computers and LANs and respective customer edge routers 126.

As further shown in FIG. 1, several of the LANs 122 and computers 120 are logically associated with different virtual private networks (VPNs). For example VPN-A encompasses several LANs 122 that may be geographically dispersed, and VPN-B encompasses other LANs 122 that may be similarly geographically dispersed. In many cases, the individual VPNs are associated with and used by individual (often corporate) customers or enterprise users.

Still also shown in FIG. 1 is a VPN service provider management tool 200, which includes an MPLS VPN link discovery module 210 that is employed to discover MPLS VPN links in the network 110. These elements can be considered to be part of an overall network management system (NMS). VPN service provider management tool 200 is in communication with at least one PE router 124, but VPN service provider management tool 200 can also be in communication with each PE router 124 directly or as a result of being connected to only one PE router 124. As will be explained in more detail later herein, VPN service provider management tool 200 obtains information about MPLS VPNs that are being established or torn down or modified, models the resulting connections and provides management information, including, in one embodiment, graphical representation of MPLS VPN links, to MPLS VPN service providers.

Preliminarily, multiprotocol label switching (MPLS) is a mechanism in communications networks that directs and carries data from one network node to the next. MPLS enables "virtual links" to be created between distant nodes using a protocol-agnostic, data-carrying mechanism. In an MPLS network, data packets are assigned labels. Packet-forwarding decisions can then be made solely on the contents of this label, without the need to examine the packet itself. This makes it possible to create end-to-end circuits across any type of transport medium, using any protocol. A primary benefit of MPLS is that it can eliminate dependence on a particular Data Link Layer technology, such as asynchronous transfer mode (ATM), frame relay, synchronous optical network (SONET) or Ethernet, and may further eliminate the need for multiple OSI Layer 2 networks to satisfy different types of traffic.

Furthermore, with MPLS it is possible to capture or obtain routing information generated by, e.g., PE routers 124 in an efficient manner and then discover MPLS VPN links that exist or that have been modified in the overall network. More specifically, each of the provider edge routers 124 maintains VPN routing information for those VPNs to which they are directly attached. In this regard, each PE router 124 maintains a virtual route forwarding (VRF) table for each of its directly connected sites such as computers 120 and LANs 122 (or, more accurately, customer edge routers 126). So that the provider edge routers 124 become aware of which routers are associated with the respective VPNs, the routers 124 exchange this VPN routing information (i.e., VRF tables) with one another so that as, e.g., MPLS labeled packetized data is received, a given router 124 can forward the packetized data to a neighbor router 124 for transmission to the intended destination.

MPLS VPN links are an important part of MPLS VPN topology representation, as these links represent the virtual forwarding paths between VRF table instances on different routers. Consequently, these links can provide a visual representation that reflects the true connectivity between various end user or customer sites (i.e., customer edge routers 126). Because the actual forwarding path can traverse across multiple provider edge (and even provider core (not shown)) routers and can make use of a variety of routing protocols in order to establish these routes, being able to accurately reconstruct a VPN topology can be very illuminating to service providers for, among other things, performance and fault monitoring.

Figure 2:
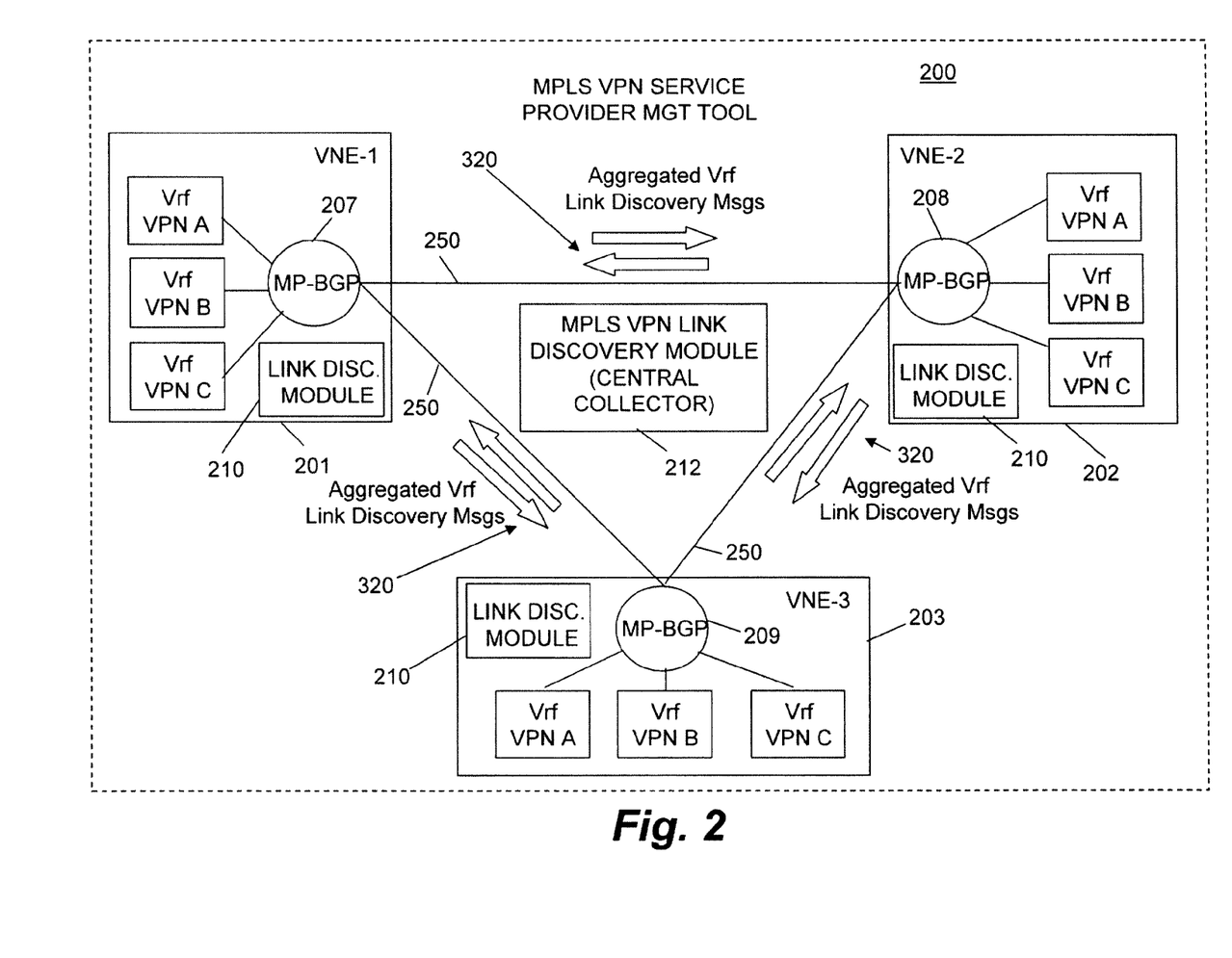
FIG. 2 shows an example implementation of a VPN service provider management tool including an MPLS VPN link discovery tool that enables messages to be passed between virtual network elements (VNEs) that model physical network elements such as those shown in FIG. 1.

FIG. 2 shows an example implementation of the VPN service provider management tool 200 that handles messages passed between virtual network elements (VNEs) that model the physical network elements shown in FIG. 1. As noted, MPLS uses the Multi Protocol (MP) Border Gateway Protocol (BGP) (MP-BGP) interdomain routing protocol for distributing VPN labels. An internal MP-BGP session is established between neighboring provider edge routers 124 so that they can exchange VRF routes. In an embodiment, there is a "device model" within the VPN service provider management tool 200 that models entities, such as a router's state or present configuration.

A "device model" in the context of the MPLS VPN link discovery methodology described herein represents the entities on the device pertaining to its configuration and operational state (e.g., the state of its routing tables). This includes not only a physical inventory, but also a logical inventory such as VRFs, Route Targets (RTs), MP-BGP routing instances and associated neighbor entries. The MPLS VPN link discovery methodology described herein operates when both the MP-BGP instances and associated VRFs are modeled as separate entities, with a containment type of relationship as shown in FIG. 2. Specifically, each VNE 201, 202, 203 models one PE router 124 such that each MP-BGP instance 207, 208, 209 is modeled separately from each of their respective VRFs, in this case represented by VPN-A, VPN-B, and VPN-C. Again, one can consider each MP-BGP instance to represent one PE router and all of the VPNs (represented by the VRF entities) that are supported by that router.

FIG. 2 further depicts lines 250, which represent logical links between peer or neighbor MP-BGP instances in the network. The MPLS VPN link discovery module 210 is "resident" within each VNE and is configured to pass messages between neighboring MP-BGP instances. A central collector 212 operates in conjunction with each of the resident MPLS VPN link discovery instances 210 operating within each VNE, as explained more fully below.

The VPN link discovery approach makes use of a distributed approach for VRF link discovery—first starting at VRF entities and then propagating through the modeled "network" of logical entities. Instead of initiating discovery by each VRF broadcasting its state to every other VRF in a neighboring VNE, this approach uses the parent MP-BGP routing instance of each VRF as a proxy for initial discovery messaging between VRFs. The MP-BGP neighbor peering is used to send aggregations of VRF discovery messages between these neighbors and their child VRF instances. This results in optimizing the discovery message protocol so that fewer VRFs that are not part of the same VPN will receive these messages.

Figure 3A:
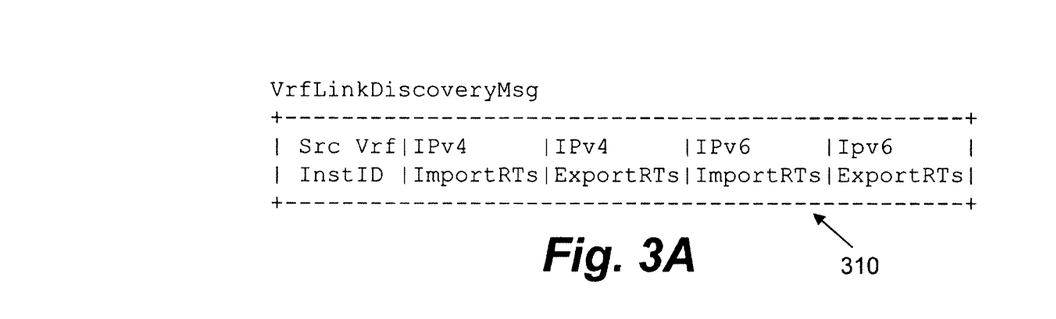
FIGS. 3A, 3B and 3C show, respectively, a unicast link discovery message, an aggregated link discovery message and a virtual route forwarding (VRF) connect message that are passed between VNEs within the VPN service provider management tool.

At initialization time, each VRF entity in the model sends a unicast link discovery initialization message (VrfLinkDiscoveryMsg 310, as shown in FIG. 3A) to its parent MP-BGP instance. The VrfLinkDiscoveryMsg 310 contains a list of both the IPv4 and IPv6 import and export Route Targets (RTs), as well as a unique address identifier for the source VRF.

Figure 3B:
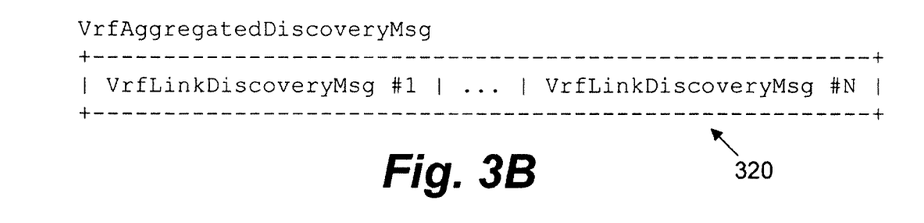
Figure 3C:
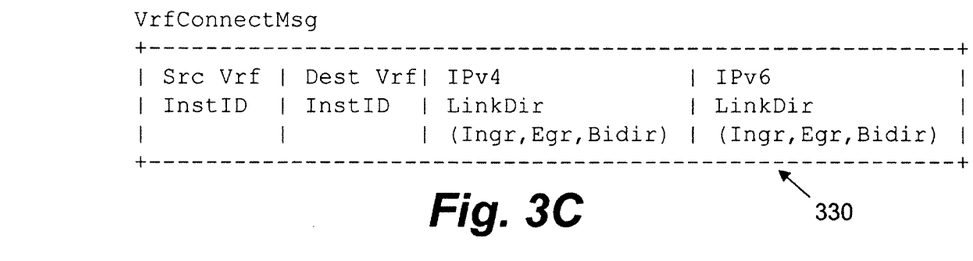

The receiving (parent) MP-BGP queues the VrfLinkDiscoveryMsg 310. When the queue size reaches a configured maximum, or a timer expires, multiple VrfLinkDiscoveryMsgs in the queue are aggregated into a single VrfAggregatedDiscoveryMsg 320 (FIG. 3) and sent to all of its established neighbor MP-BGP entities.

The receiving MP-BGP entity will either forward the received message to all of its BGP clients (if it is a Route Reflector), or will disaggregate the message into its individual VrfLinkDiscoveryMsg components and forward all of these to all of the contained VRF entities.

A receiving VRF entity will then try to match the incoming Route Targets with its own set of Route Targets. If there is a match, it will attempt to establish a virtual link between itself and the source VRF entity. This can be accomplished by sending a VrfConnectMsg 330 (FIG. 3) directly to the source VRF entity (without necessarily passing through the MP-BGP instance). The VrfConnectMsg 330 contains an attribute that indicates the link direction. The direction of the link (ingress, egress, bidirectional) is determined by the import/export Route Target matching. Although not expressly shown in FIG. 2, VrfConnectMsgs 330 are exchanged directly with a matched VRF entity. Once connected, this state is reported to central collector 212. The collected states of connected VRFs can then be used by the VPN service provider management tool 200 to visually display links and better manage the overall network.

Incremental (i.e., after initialization) discovery of MPLS VPN links is accomplished by triggering a new VrfLinkDiscoveryMsg 310 from a VRF entity for, at least, one of the following reasons:

There is a change in the VRF Route Targets configuration. In one possible implementation, only changed Route Targets need to be included in the subsequent VrfLinkDiscoveryMsg.

There is a change in the BGP neighbor peering. In an embodiment, such a change will cause the MP-BGP instance to "wake up" each of its child VRFs and trigger them to send a VrfLinkDiscoveryMsg which contains all of its import and export Route Targets.

A VRF is added. This is similar to a change in VRF Route Targets configuration in that all the targets are new with a newly added VRF.

The performance of the present VPN link discovery methodology can be compared directly to a broadcast messaging discovery approach (i.e., without using an MP-BGP message aggregation technique as described herein). In this approach each VRF sends its targets to every other VRF in the model to ensure that all VRFs will be able to perform Route Target matching. The expected performance for the broadcast messaging discovery approach and the message aggregating approach is outlined below. For both scenarios, a hypothetical network is assumed to contain one Route Reflector, 500 provider edge (PE) devices (e.g., routers) and 50 VRFs per provider edge device.

VRF Broadcast Group Discovery Algorithm

This approach requires that VrfLinkDiscoveryMsgs be sent to every other VRF in the network in order to match RTs and compute VRF links. If N_Vrf is the number of VRFs in the entire network, then the total number of VrfLinkDiscoveryMsgs that are required to be sent are:

$$\text{Total Msgs} = N\_Vrf(N\_Vrf - 1)$$

For the hypothetical example, N_Vrf=500*50=25000.

$$\text{Total Msgs} = 25000*24999 = 624{,}975{,}000$$

The total number of messages for this approach is thus $O(N\_Vrf**2)$.

Aggregated VRF Link Discovery Approach

The total number of messages that need to be sent is dependent on specific network configurations of VRFs and BGP neighbors. However, for a case where there is a single Route Reflector (RR) which serves BGP clients that are provider edge routers, the following formula applies:

$$\text{Total Msgs} = (N\_PE*N\_VrfsPE) + (N\_PE*1) + (N\_PE*(N\_PE-1)) + (N\_PE*N\_VrfsPE)$$

where

N_PE=number of PEs in network
N_VrfsPE=average number of Vrfs per PE
(N_PE*N_VrfsPE)=total msgs sent from local Vrfs to parent src MP-BGP (VrfLinkDiscoveryMsgs)
(N_PE*1)=total msgs sent from src MP-BGP to RR (VrfAggregatedDiscoveryMsg)
(N_PE*(N_PE-1))=total msgs sent from RR to all connected client MP-BGPs (VrfAggregatedDiscoveryMsg)
(N_PE*N_VrfsPE)–total msgs sent from dest MP-BGP to child Vrfs For the hypothetical example, N_PE=500, N_VrfsPE=50

$$\text{Total Msgs} = (500*50) + (500*1) + (500*499) + (500*50) = 300{,}000$$

The total number of messages for this approach is this $O(N\_PE**2)$, since $(N\_PE*(N\_PE-1))$ is the dominant term in this calculation.

The foregoing calculations assume that each aggregated message comprises all messages from VRFs supported by each MP-BGP instance.

The conclusion is that the performance improvement over the broadcast solution is by several orders of magnitude, given that N_PE is much less than N_Vrfs (N_PE<<N_Vrfs).

Figure 4:
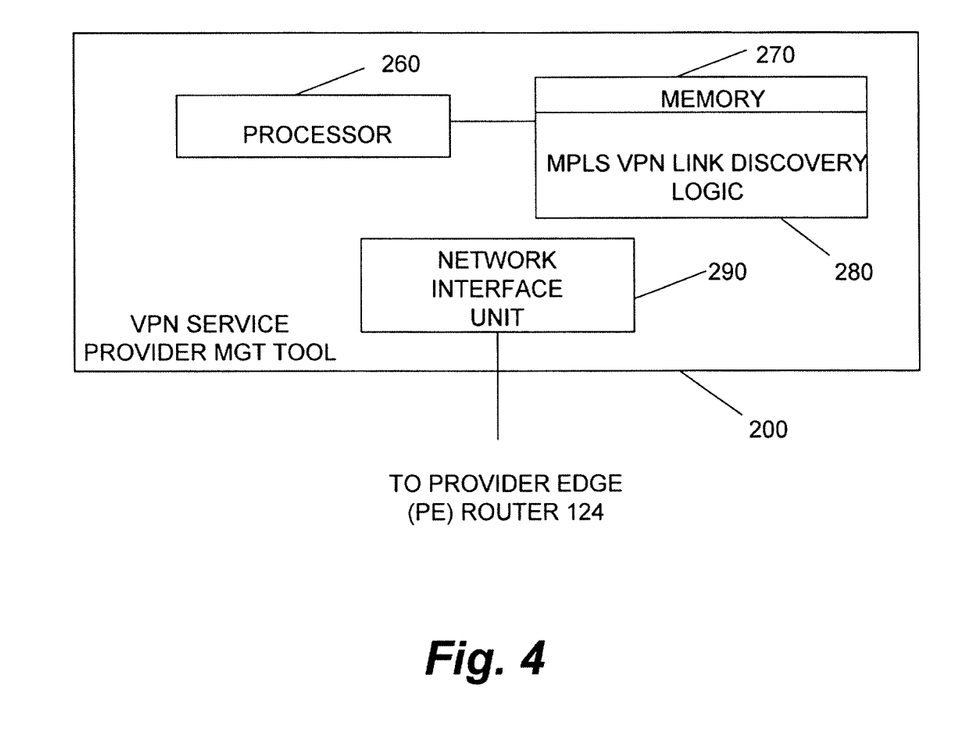
FIG. 4 shows an embodiment of a VPN service provider management tool in accordance with one possible embodiment.

FIG. 4 shows an embodiment of a VPN service provider management tool 200 in accordance with one possible embodiment. The functionality of VPN service provider management tool 200 may be implemented as one or more hardware components, one or more software components (written in, e.g., C++ or Java, among many other possible languages), or combinations thereof. More specifically, VPN service provider management tool 200 may be comprised of a programmable processor (microprocessor or microcontroller) or a fixed-logic processor 260. In the case of a programmable processor, any associated memory 270 may be of any type of tangible processor readable memory (e.g., random access, read-only, etc.) that is encoded with or stores instructions, such as MPLS VPN link discovery logic 280 that may employed to effect the functionality of MPLS VPN link discovery module 210. Alternatively, VPN service provider management tool 200 may be comprised of a fixed-logic processing device, such as an application specific integrated circuit (ASIC) or digital signal processor that is configured with firmware comprised of instructions or logic (e.g., MPLS VPN link discovery logic 280) that cause the processor 260 to perform the functions described herein. Thus, VPN service provider management tool 200 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor (or computer) readable medium that is encoded with instructions for execution by a processor that, when executed by the processor, are operable to cause the processor to perform the functions described herein. To enable connectivity with network infrastructure, a network interface unit 290 may also be provided.

It should also be noted that when VPN service provider management tool 200 and associated MPLS VPN link discovery logic 280 may be instantiated on multiple hardware platforms, especially when the number and size of device models is beyond the capability of any single hardware device.

Figure 5:
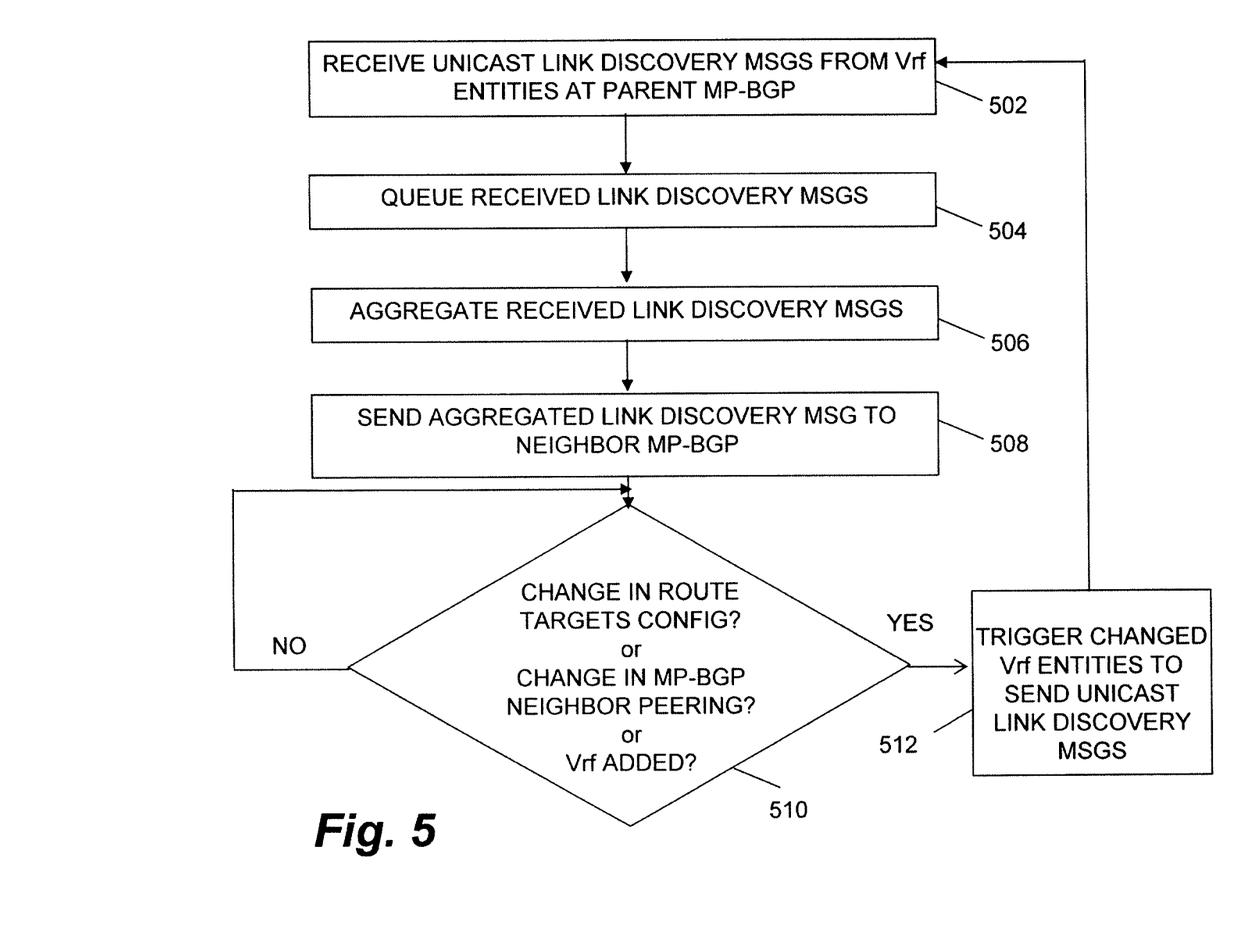
FIG. 5 depicts an example series of steps that may be performed by the VPN service provider management tool to discover VPN links in a communication network.

Reference is now made to FIG. 5, which depicts an example series of steps that may be performed within, e.g., VPN service provider management tool 200. Although depicted as beginning at step 502, the illustrated process may, in a practical implementation, begin at step 512 as will be explained below. At step 502 a parent MP-BGP entity within a VNE (a network element represented in the network model developed by VPN service provider management tool 200) receives unicast link discovery messages from VRF entities that are logically associated with the parent MP-BGP. At step 504, the received unicast link discovery messages from respective VRFs are queued within the parent MP-BGP instance. At step 506, multiple unicast link discovery messages are aggregated into a single MP-BGP message encapsulating the individual VRF link discovery messages. As shown in FIG. 3A, each VRF link discovery message includes, in one embodiment, a source VRF instance identifier, IPv4 import and export Route Targets, and IPv6 import and export Route Targets. These individual VRF link discovery (or identification) messages, are aggregated in a VrfAggregatedDiscoveryMsg shown in FIG. 3B. This message is a single MP-BGP message that can be sent to a neighbor MB-BGP entity.

At step 508, the single MP-BGP message that encapsulates a plurality of VRF link discovery messages (i.e., the VrfAggregatedDiscoveryMsg shown in FIG. 3B) is sent to neighbor MP-BGP entities, as shown in FIG. 2. Precisely when the single aggregated message is sent can be based on a predetermined time, or on when some predetermined number of unicast link discovery messages are present in the queue.

For the predetermined time approach, perhaps a period of 5 minutes may be reasonable to capture VPN links in a timely fashion, from the perspective of VPN service provider. For the predetermined number of unicast link discovery messages approach, a number of aggregated messages may be on the order of 50, taking into account, the capacity of an MP-BGP message and model architecture, among other possible considerations.

In one embodiment, steps 502-508 are performed at initialization. That is, when the model of the various network elements is being established within the VPN service provider management tool 200, a first step is to identify all existing VPN links. This can be accomplished, at least preliminarily, by running though steps 502-508, and then performing the steps depicted in FIG. 6, which are used to connect VRFs with one another (in the model) and establish or identify the complete VRF link.

Referring still to FIG. 5, and after the initialization period, at step 510 it is determined whether there has been a change in Route Targets configuration in any VRF, among other possible changes discussed below. In other words, it is determined whether there has been a change to a VRF link. If yes, then the process in FIG. 5 proceeds to step 512 where changed VRF entities are triggered to send (once again) unicast link discovery messages, which in turn are received by the MP-BGP instances at step 502. In other words, when some type of change is detected in the network, which change is detected within the VPN service provider management tool 200 and its model of the network, VRF link discovery is initiated with respect to changed entities to obtain the latest link information. In this respect, the process depicted in FIG. 5 can be said to also "begin" at step 512 where, even at initialization, the process does not begin until a VRF entity sends a unicast link discovery message.

Another change within step 510 that may cause VRF entities to be triggered to send unicast link discovery messages is whether there has been a change in MP-BGP neighbor peering. If there has been a change, then the process likewise proceeds to step 512 to initiate, once again, an "update" link discovery process with the VRF associated with the changed MP-BGP. Still another change that can be detected within step 510 is whether a VRF has been added. If yes, and as before, link discovery is triggered in step 512. If no changes are detected or observed, the process continues to "loop through" step 510 to detect or observe subsequent changes. Thus, this loop monitors the network being modeled for changes that would indicate that links have been changed and link discovery should be re-initiated.

Figure 6:
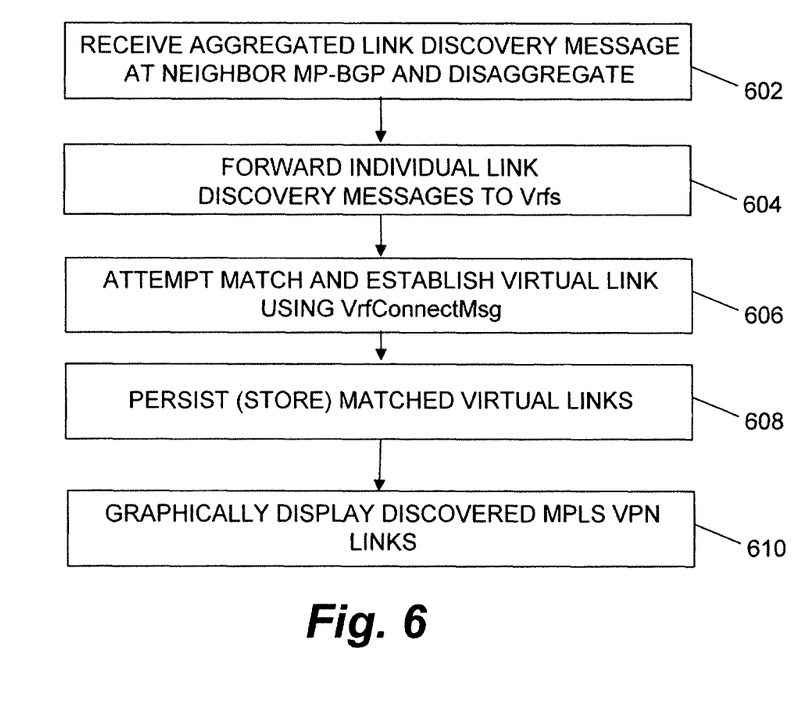
FIG. 6 depicts an example series of steps that may be performed by a neighbor or peer multi protocol border gateway protocol (MP-BGP) instance in response to receiving an aggregated link discovery message.

FIG. 6 depicts steps that occur at a neighbor MP-BGP instance within the model. At step 602, an aggregated link discovery message is received, and the individual unicast link discovery messages are disaggregated from each other. At step 604, each of these unicast link discovery messages is passed to the VRF entities associated with the neighbor MP-BGP instance. The receiving VRF entities in the neighbor MP-BGP instance attempt to match the incoming Route Targets with its own set of Route Targets. If there is a match, it will attempt to establish a virtual link between itself and the source VRF entity, as indicated by step 606. As mentioned earlier, this can be accomplished by sending a VrfConnectMsg 330 (FIG. 3) directly to the source VRF entity. The VrfConnectMsg 330 contains an attribute that indicates the link direction. The direction of the link (ingress, egress, bidirectional) is determined by the import/export Route Target matching. Matched links may be persisted (stored) in a memory or database at step 608.

Once VPN service provider management tool 200 in conjunction with MPLS VPN link discovery module 210 and associated collector 212 are able to identify VPN links within the network, VPN service provider management tool 200 may provide, as indicated by step 610, a visual or graphical display to the service provider, showing which customer sites (customer edge routers 126) are connected to each other. Reports may also be generated regarding the sizes of selected VPNs. For example, reports might indicate the number of nodes in a given VPN, the number of routers that are employed to support the selected VPN, etc. This information may be used to better manage the overall network, and determine, for example, whether it might be necessary to reconfigure aspects of the network. The information may also be used for fault management, i.e., are links operating nominally.

Thus, as described herein, a VPN service provider management tool 200 leverages device models in order to provide an efficient discovery of the links between the VRFs that comprise MPLS VPNs. It does so by sending aggregations of unicast discovery message sequences between VRF endpoints by way of intermediate MP-BGP instances, thereby reducing the total number of messages required and eliminating redundant messaging.

The links that are discovered provide an accurate representation of the true connectivity of the VPN within the network, based upon both the Route Target configurations as well as MP-BGP peering configuration.

The approach described herein scales very well to larger network installations, since the approach makes use of distributed, asynchronous messaging in order to perform full VRF link discovery.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
receiving a plurality of virtual route forwarding identification messages generated by respective virtual route forwarding entities at a logical parent Multi-Protocol Border Gateway Protocol instance resident within a virtual network element in a network management system;
aggregating in the logical parent Multi-Protocol Border Gateway Protocol instance the plurality of virtual route forwarding identification messages into a single Multi-Protocol Border Gateway Protocol message encapsulating the plurality of virtual route forwarding identification messages; and
sending the single Multi-Protocol Border Gateway Protocol message encapsulating the plurality of virtual route forwarding identification messages to a neighbor parent Multi-Protocol Border Gateway Protocol instance.

2. The method of claim 1, further comprising sending the single Multi-Protocol Border Gateway Protocol message upon receipt of a predetermined number of virtual route forwarding identification messages at the logical parent Multi-Protocol Border Gateway Protocol instance.

3. The method of claim 1, further comprising sending the single Multi-Protocol Border Gateway Protocol message at a predetermined time.

4. The method of claim 1, wherein the virtual route forwarding identification messages comprise unicast link discovery messages sent by respective virtual route forwarding entities.

5. The method of claim 1, further comprising receiving a virtual route forwarding connect message from a virtual route forwarding entity associated with the neighbor Multi-Protocol Border Gateway Protocol instance responsive to the single Multi-Protocol Border Gateway Protocol message encapsulating the plurality of virtual route forwarding identification messages.

6. The method of claim 1, wherein the receiving, aggregating and sending are performed upon detecting a change in a configuration of virtual route forwarding route.

7. The method of claim 1, wherein the receiving, aggregating and sending are performed upon detecting a change in a Multi-Protocol Border Gateway Protocol neighbor peering relationship.

8. The method of claim 1, wherein the receiving, aggregating and sending are performed upon detecting an addition or deletion of a virtual route forwarding entity.

9. The method of claim 1, further comprising displaying, via a graphical user interface, links discovered between selected virtual route forwarding entities.

10. The method of claim 1, further comprising:
disaggregating the single Multi-Protocol Border Gateway Protocol message encapsulating the plurality of virtual route forwarding identification messages; and
passing individual ones of the plurality of virtual route forwarding identification messages to respective virtual route forwarding entities logically disposed behind the neighbor parent Multi-Protocol Border Gateway Protocol instance.

11. The method of claim 10, further comprising:
matching route targets included in respective virtual route forwarding identification messages with route targets of virtual route forwarding entities associated with the neighbor parent Multi-Protocol Border Gateway Protocol instance; and
when a match is identified, establishing a virtual link between virtual route forwarding entities having matching route targets.

12. A non-transitory processor readable medium encoded with instructions that, when executed by a processor, cause the processor to:
receive a plurality of virtual route forwarding identification messages generated by respective virtual route forwarding entities at a logical parent Multi-Protocol Border Gateway Protocol instance;
aggregate in the logical parent Multi-Protocol Border Gateway Protocol instance the plurality of virtual route forwarding identification messages into a single Multi-Protocol Border Gateway Protocol message encapsulating the plurality of virtual route forwarding identification messages; and
send the single Multi-Protocol Border Gateway Protocol message encapsulating the plurality of virtual route forwarding identification messages to a neighbor parent Multi-Protocol Border Gateway Protocol instance.

13. The non-transitory processor readable medium of claim 12, further comprising instructions that, when executed by the processor, cause the processor to:
send the single Multi-Protocol Border Gateway Protocol message upon receipt of a predetermined number of virtual route forwarding identification messages at the logical parent Multi-Protocol Border Gateway Protocol instance.

14. The non-transitory processor readable medium of claim 12, further comprising instructions that, when executed by the processor, cause the processor to:
send the single Multi-Protocol Border Gateway Protocol message at a predetermined time.

15. The non-transitory processor readable medium of claim 12, further comprising instructions that, when executed by the processor, cause the processor to:
receive a virtual route forwarding connect message from a virtual route forwarding entity associated with the neighbor Multi-Protocol Border Gateway Protocol instance responsive to the single Multi-Protocol Border Gateway Protocol message encapsulating the plurality of virtual route forwarding identification messages.

16. The non-transitory processor readable medium of claim 12, further comprising instructions that, when executed by the processor, cause the processor to:
graphically display virtual private network links between nodes in a network modeled by the virtual route forwarding entities.

17. The non-transitory processor readable medium of claim 12, further comprising instructions that, when executed by the processor, cause the processor to:
disaggregate the single Multi-Protocol Border Gateway Protocol message encapsulating the plurality of virtual route forwarding identification messages; and
pass individual ones of the plurality of virtual route forwarding identification messages to respective virtual route forwarding entities logically disposed behind the neighbor parent Multi-Protocol Border Gateway Protocol instance.

18. An apparatus, comprising:
a network interface; and
a processor that is configured to:
receive a plurality of virtual route forwarding identification messages generated by respective virtual route forwarding entities at a logical parent Multi-Protocol Border Gateway Protocol instance;

aggregate in the logical parent Multi-Protocol Border Gateway Protocol instance the plurality of virtual route forwarding identification messages into a single Multi-Protocol Border Gateway Protocol message encapsulating the plurality of virtual route forwarding identification messages; and send the single Multi-Protocol Border Gateway Protocol message encapsulating the plurality of virtual route forwarding identification messages to a neighbor parent Multi-Protocol Border Gateway Protocol instance.

19. The apparatus of claim 18, wherein the processor is further configured to:

disaggregate the single Multi-Protocol Border Gateway Protocol message encapsulating the plurality of virtual route forwarding identification messages; and pass individual ones of the plurality of virtual route forwarding identification messages to respective virtual route forwarding entities logically disposed behind the neighbor parent Multi-Protocol Border Gateway Protocol instance.

20. The apparatus of claim 18, wherein the processor is further configured to:

match route targets included in respective virtual route forwarding identification messages with route targets of virtual route forwarding entities associated with the neighbor parent Multi-Protocol Border Gateway Protocol instance; and when a match is identified, establish a virtual link between virtual route forwarding entities having matching route targets.

* * * * *